US009502997B2

(12) United States Patent
Laing et al.

(10) Patent No.: US 9,502,997 B2
(45) Date of Patent: Nov. 22, 2016

(54) ENGINE CONTROL FOR A SYNCHRONOUS MOTOR

(75) Inventors: Karsten Laing, Althütte (DE); Herbert Grabner, Linz (AT); Siegfried Silber, Kirchschlag (AT)

(73) Assignee: XYLEM IP HOLDINGS LLC, Rye Brook, NY (US)

( * ) Notice: Subject to any disclaimer, the term of this patent is extended or adjusted under 35 U.S.C. 154(b) by 220 days.

(21) Appl. No.: 14/344,900

(22) PCT Filed: Sep. 13, 2012

(86) PCT No.: PCT/EP2012/067986
§ 371 (c)(1),
(2), (4) Date: Nov. 4, 2014

(87) PCT Pub. No.: WO2013/037908
PCT Pub. Date: Mar. 21, 2013

(65) Prior Publication Data
US 2015/0108938 A1    Apr. 23, 2015

(30) Foreign Application Priority Data
Sep. 15, 2011   (AT) .................................. A 1331/2011

(51) Int. Cl.
| H02P 1/46 | (2006.01) |
| H02P 6/00 | (2016.01) |
| H02P 21/05 | (2006.01) |
| H02P 21/00 | (2016.01) |

(Continued)

(52) U.S. Cl.
CPC ............... H02P 6/002 (2013.01); H02K 21/14 (2013.01); H02P 6/28 (2016.02); H02P 21/0089 (2013.01);
(Continued)

(58) Field of Classification Search
CPC ........... H02P 29/0038; H02P 21/0089; H02P 21/05; H02P 23/04; H02P 6/002
See application file for complete search history.

(56) References Cited

U.S. PATENT DOCUMENTS

| 2011/0204833 A1 | 8/2011 | Santo et al. |
| 2011/0298405 A1* | 12/2011 | Costanzo ............ H02P 29/0038 318/400.23 |
| 2014/0027209 A1* | 1/2014 | Kallioniemi .......... B66B 5/0025 187/391 |

FOREIGN PATENT DOCUMENTS

| DE | 10 2005 017073 A1 | 11/2005 |
| DE | 10 2008 023 574 A1 | 11/2009 |

(Continued)

OTHER PUBLICATIONS

PCT/EP2012/067986, Aug. 14, 2013, International Search Report and Written Opinion.

*Primary Examiner* — Karen Masih
(74) *Attorney, Agent, or Firm* — Workman Nydegger

(57) ABSTRACT

The invention relates to an engine control for a synchronous motor having a number of N stator coils set off in regard to each other, which are arranged around a rotor of the synchronous motor, wherein there may be impressed upon the stator coils by the engine control a coil voltage and wherein there is formed a coil current having a direct current component in a co-ordinate system rotating proportionally with the number of revolutions performed by the synchronous motor as well as a cross current component, wherein the cross current component effects a tangential force activating the rotor in the direction of rotation and wherein the direct current component effects a force acting perpendicularly to the rotor surface on the rotor, wherein the engine control has a direct current generator for generating a direct current component periodically alternating in the rotating co-ordinate system, in order to neutralize oscillations of the synchronous motor activated by the engine control by means of the force generated perpendicularly to the rotor surface, wherein the direct current generator is formed for evaluating at least one angle information and an operating cross current.

8 Claims, 3 Drawing Sheets

(51) Int. Cl.
*H02P 23/04* (2006.01)
*H02K 21/14* (2006.01)

(52) U.S. Cl.
CPC ............... *H02P 21/05* (2013.01); *H02P 21/18* (2016.02); *H02P 23/04* (2013.01); *H02P 25/03* (2016.02); *H02P 2205/01* (2013.01); *H02P 2209/11* (2013.01)

(56) References Cited

FOREIGN PATENT DOCUMENTS

| EP | 1 944 861 | A2 | 7/2008 |
| EP | 2 019 473 | A1 | 1/2009 |

\* cited by examiner

ENGINE CONTROL FOR A SYNCHRONOUS MOTOR

CROSS REFERENCE TO RELATED APPLICATIONS

This application is a U.S. Nationalization of PCT Application Number PCT/EP2012/067986, filed on Sep. 13, 2012, which claims priority to Austrian Patent Application No. A 1331/2011, filed on Sep. 15, 2011, the entireties of which are incorporated herein by reference.

The invention relates to an engine control for a synchronous motor having a number of N stator coils set off in regard to each other and which are arranged around the rotor of the synchronous motor, wherein there may be impressed upon the stator coils coil voltage by the engine control, and wherein there is formed coil current having a direct current component in the co-ordinate system which rotates proportionally to the number of revolutions performed by the motor and having a cross current, wherein the cross current component generates a tangential force activating the rotor in the direction of rotation, and wherein the direct current component effects a force oriented perpendicularly to the rotor surface onto the rotor.

The invention further relates to a method for controlling a synchronous motor, in which there is impressed coil voltage upon a number of N stator coils set off in regard to each other and arranged around a rotor of the synchronous motor and in which there is formed coil current, wherein the coil current has a direct current component in a co-ordinate system which rotates proportionally to the number of revolutions performed by the synchronous motor and which has a cross current, and wherein the cross current component generates a tangential force activating the rotor in the direction of rotation, with the direct current component effecting a force, oriented perpendicularly to the rotor surface, onto the rotor.

The document DE 10 2008 023 574 A1 discloses a circulation pump with an electric motor formed by a spherical motor, wherein the spherical motor is an engine with a hemispherical rotor. The rotor of the spherical engine is supported at a spherical bearing having a sliding element with a convex and spherical surface and a bearing cup with a concave spherical surface. The rotor comprises several permanent magnets, and the stator comprises several stator coils set off in regard to each other. The spherical motor displayed in this document is activated by an engine control as a synchronous motor.

Such an engine control for synchronous motors is known, for example, in the integrated circuit of the classification STM32 by the company STMicroelectronics. The engine control known has a field oriented control, in which there is impressed coil current upon the stator coils by the engine control, with the coil current having a direct current component in a co-ordinate system which rotates in accordance with the number of revolutions performed by the synchronous motor and having a cross current component. The cross current component is known as "quadrature axis component" among experts, and it generates a tangential force according to the Lorentz force law, which acts tangentially to the circumference of the spherical motor and therewith activates the spherical motor rotating in the direction of rotation. The engine control known activates the spherical motor with the cross current component according to the desired number of revolutions of the spherical engine.

The direct current component is known among experts as "direct axis component", and it generates, according to the Lorentz force law, a force which acts perpendicularly to the rotor surface. The engine control known activates the spherical motor with a direct current component of constant amplitude in order to weaken the magnetic field in the case of a large number of revolutions performed by the spherical motor. This is necessary as the permanent magnet excited synchronous motor also induces high voltages at its clamps (EMK, electromagnetic force). If the induced voltage equals the supply voltage, the synchronous motor cannot become faster, even if the load torque is approximately zero. By weakening the field, it is possible to reduce the induced voltage at the engine clamps, in this way increasing the maximum number of revolutions. As this measure, however, reduces the degree of efficiency, it will only be applied in very particular cases.

In practice, the spherical motor activated by the engine control known has shown that there might be generated mechanical oscillations conditional upon mechanical, electrical or magnetic asymmetries of the electric motor and/or the pump. Mechanical asymmetries may be, for example, the result of an asymmetry of the rotor or a rotor disc of the pump, of a not ideal concentric position between rotor and stator due to component part tolerances or due to operational signs of wear of the bearing cups. Electromagnetic asymmetries of the stator field may be developed, for example, because of the tolerance of the individual coils, especially in their arrangement within the stator and due to the slightly different coil winding lengths. Magnetic asymmetries may be developed in the case of rotors with permanent magnets conditional upon an asymmetrical magnetic field of the permanent magnets produced. These oscillations may be transmitted via the heat pipes into the entire heating system if there is made use of the spherical engine as a heating-circulation pump and this may result in undesired noise in the entire house. But also in other synchronous motors activated by the known engine controls, such as for example electric motors with cylindrical rotor, in which the forces may, in theory, even neutralise each other, there have been generated mechanical oscillations due to elastic deformation on the basis of the application of force, and a slightly not ideal arrangement of the synchronous motor with symmetry in rotation.

The invention is based on the aim to provide an engine control for a synchronous motor which systematically counteracts the mechanical oscillations of the synchronous motor in order to distinctively minimise these and therewith remarkably reduce the oscillations and noise emitted by the synchronous motor.

This challenge is solved in an engine control according to the invention by means of the fact that the engine control has a direct current generator for generating a direct current component, which is periodically alternating in the rotating co-ordinate system, in order to balance oscillations of the synchronous motor activated by the engine control by means of a force generated perpendicularly to the rotor surface, wherein the direct current generator is formed for evaluating at least one angle formation and an operating cross current.

This task is solved in a method for controlling a synchronous motor according to the invention by means of the fact that there is generated a periodically alternating direct current component in the rotating co-ordinate system that is predetermined by the coil voltage impressed in order to neutralise oscillations of the synchronous motor activated by the engine control by means of a force generated perpendicularly to the rotor surface, wherein there is evaluated at least one angle formation and one operating cross current for generating the suitable and periodically alternating direct current component.

By providing the direct current generator for generating a direct current component which is periodically alternating with the rotating co-ordinate system, there is provided the advantage that electro-magnetic oscillations of the rotor are excited by forces acting perpendicularly to the rotor surface by means of the direct current component, which neutralise the undesired mechanical oscillations and, in an ideal way, entirely compensate for these. It has proved especially advantageous to measure a synchronous motor to be activated by the engine control by arranging mechanical sensors in order to evaluate the mechanical oscillations that are really generated in this particular synchronous motor. The result of the measurement consequently is stored in the adaptation means of the engine control as adaptation information in the form of parameters. These parameters do exert some influence on amplitude, phase and frequency of the direct current component to be released from the engine control to the particular synchronous motor. Hereby, it is an advantage that the engine control may be adapted to the undesired mechanical oscillations of a particular synchronous motor activated by the engine control, wherein there is achieved an especially good suppression of the undesired mechanical oscillations by means of the oscillations which have antipoles and which are electromechanically generated.

It is to be noted that, in the case of a synchronous motor with cylindrical rotor and an ideal and symmetrical arrangement, the radial forces generated by the direct current component neutralise each other. Even if these pulsating forces neutralise each other altogether, they will result in an oscillation between rotor and stator, this is in the "air gap", thereby producing noise. Also smaller or bigger asymmetries in the rotor or the stator will result in the generation of oscillations. For this reason, it has been shown in practice that the effect of compensation described may also be realised in the case of synchronous motors with cylindrical rotor.

It has proved especially advantageous to use the engine control according to the invention for controlling a spherical motor. Due to the asymmetrical configuration of the rotor of a spherical motor, the radial forces effected by the direct current components even in the case of a rotor of the spherical motor with an ideal symmetrical rotation do not neutralise each other and hence may be very effectively used for compensating for the undesired mechanical oscillations of the spherical motor.

The effect of compensation described above may also be achieved by providing a direct voltage generator instead of the direct current generator. The direct voltage generator hence may also neutralise the oscillations of the synchronous motor activated by an engine control by generating a periodically alternating direct voltage component in the rotating co-ordinate system, as there is generated the desired direct current by means of a predetermined specification of the voltage, as has been described above. This leads to the generation of a periodically alternating direct current component, in the case of the embodiment with a direct current generator as well as in the embodiment with a direct voltage generator, in order to compensate for oscillations conditional upon the electric motor and/or the pump.

Further advantageous embodiments of the engine control according to the invention are described in the following in greater detail with regard to the figures.

Figure 3:
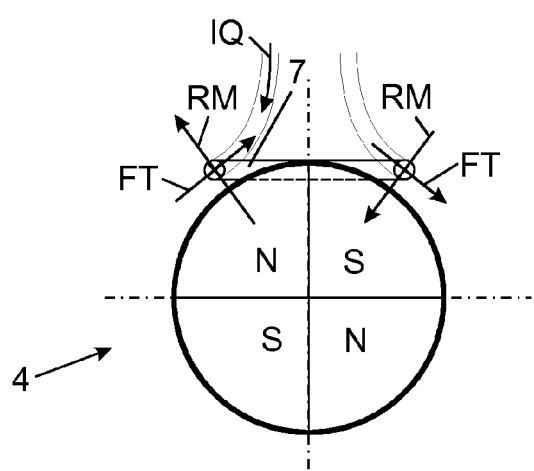

FIG. 3 figuratively shows forces acting on the rotor of the spherical motor if there is impressed a cross current component upon the stator coil.

Figure 4:
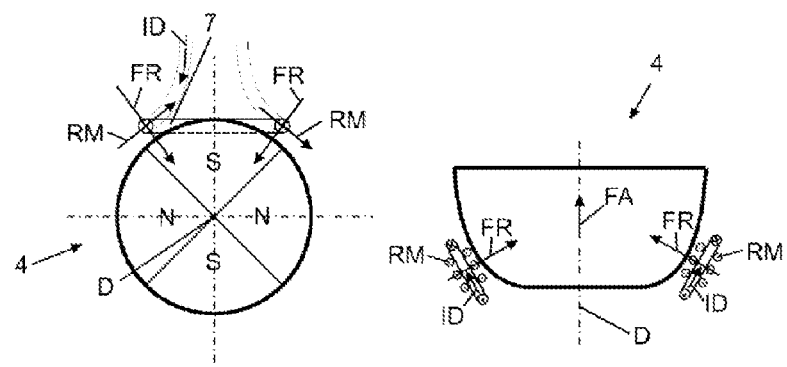

FIG. 4 figuratively shows forces acting on the rotor of the spherical motor if there is impressed a direct current component upon the stator coil.

Figure 5:
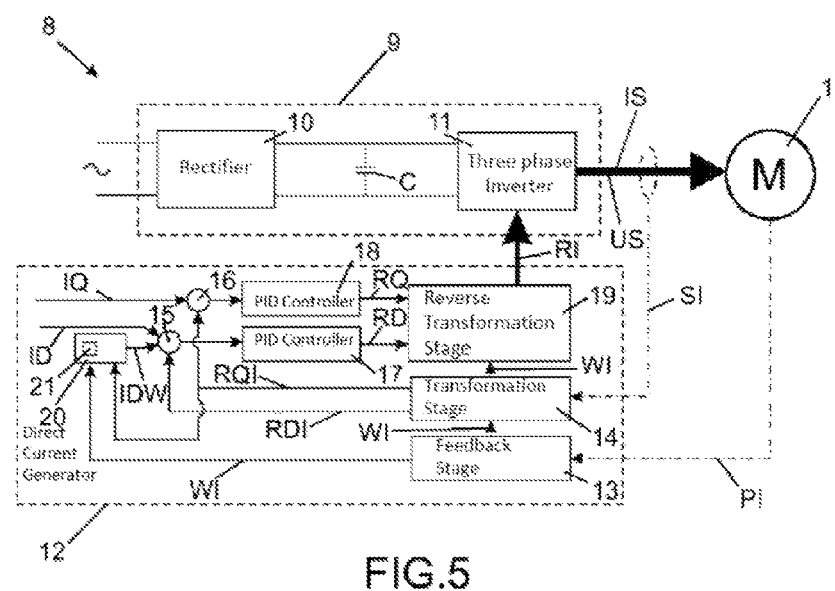

FIG. 5 shows a block diagram of an engine control with a direct current generator.

Figure 6:
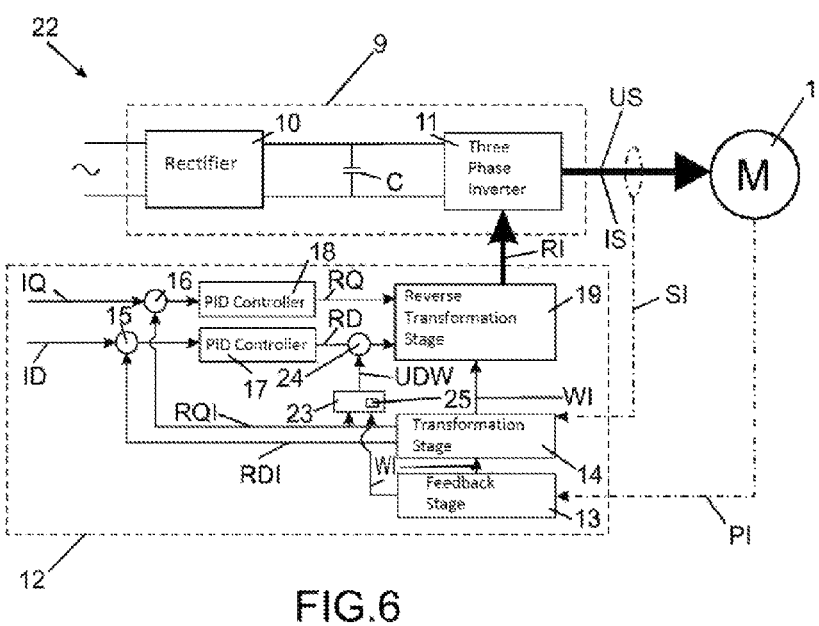

FIG. 6 shows a block diagram of an engine control with a direct voltage generator.

Figure 1:
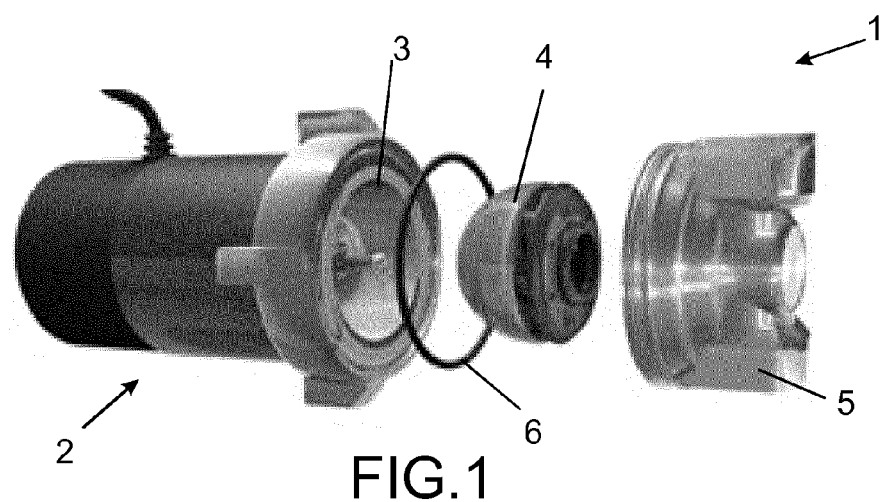
FIG. 1 shows an exploded view of a spherical motor according to FIG. 5 or according to FIG. 6 activated by an engine control as a synchronous motor.

FIG. 1 shows an exploded view of a motor with a hemispherical rotor and of a spherical motor 1, respectively, which may be activated by an engine control according to FIG. 5 or according to FIG. 6 as a synchronous motor. The spherical motor 1 comprises an electric motor 2 with a stator 3, a rotor 4 and a pump element 5 in which the medium to be pumped is pumped. A gasket seal 6 seals the pump element 5 with the electric motor 2.

Figure 2:
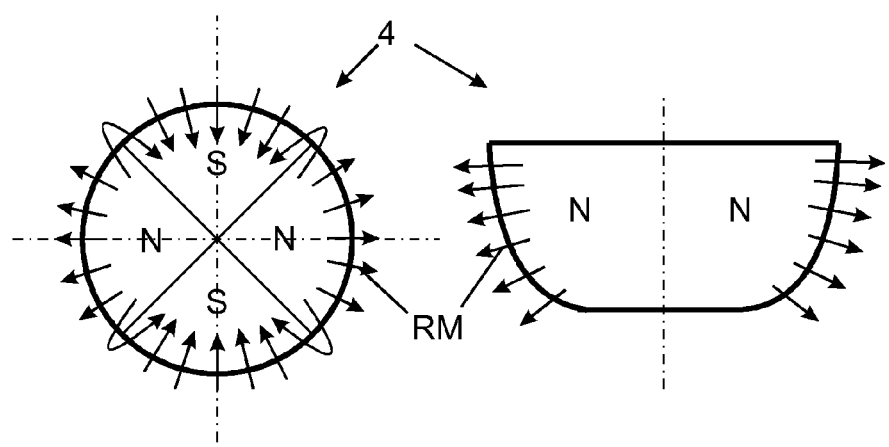
FIG. 2 shows the permanent magnetic field impression of the rotor of a spherical motor being magnetised by four poles.

The rotor 4 comprises several permanent magnetic elements, and it is formed as a four-pole permanent magnet with two north poles and two south poles. FIG. 2 shows the permanent magnetic field impression of the rotor magnetic field RM of the rotor 4, wherein on the left side in FIG. 2 there is shown a top view of the spherical part of the rotor 4, and in FIG. 2 on the right side there is displayed a side view of the rotor 4.

The stator 3 of the electric motor 3 has N=3 stator coils set off by 120 degrees per magnetic pole pair, wherein in FIG. 3 there is displayed in a figurative way one of these stator coils 7. When a motor is activated by an engine control as a synchronous motor, there is impressed a stator magnetic field MS by the stator coils, which rotates proportionally with the number of revolutions performed by the synchronous motor and which co-operates with the permanent rotor magnetic field and activates the rotor with the desired number of revolutions. In order to simplify matters, there are described the currents and voltages in the stator coils of a synchronous motor in the co-ordinate system rotating proportionally to the number of revolutions performed by the synchronous motor. This operation that is also known as Clark and Park Transformation transfers the variables of a fixed tri-axial co-ordinate system displaced by 120 degrees (the angle is valid for three-phase-drives) into a biaxial co-ordinate system with axes being oriented orthogonally to each other. Such a Clark and Park Transformation has been known for engine controls for a longer time, and it has been realised in integrated circuits commonly available.

In a two-pole permanent magnet in the rotor (one pole pair) the stator magnetic field and hence also the co-ordinate system would rotate with the simple number of revolutions performed by the synchronous motor. In a four-pole rotor magnetic field (two pole pairs), such as with the rotor 4 of the spherical motor 1, the co-ordinate system rotates with the double number of revolutions performed by the synchronous motor. This applies accordingly with a higher number of poles. The engine control according to FIG. 5 now impresses in the co-ordinate system rotating proportionally to the number of revolutions performed by the spherical motor 1 a coil voltage US upon the stator coil, whereby there is generated a coil current IS dependent on the electrical features of the stator coil 7. This coil current has a direct current component ID and a cross current component IQ, wherein there is provided a phase displacement by 90 degrees between the two current components.

In FIG. 3 there is formed the cross current component IQ in the stator coil 7 interacting with the rotor magnetic field RM. Due to this interaction (Lorentz force) between coil current IS and the rotor magnetic field RM, a tangential force FT acts on the rotor 4 of the spherical motor 1, activating the rotor 7 with the predetermined number of revolutions.

In FIG. 4 there is formed the direct current component ID in the stator coil 7 interacting with the rotor magnetic field RM. Due to this interaction between coil current IS and the rotor magnetic field RM a force FR acts perpendicularly to the rotor surface 4 onto the rotor 4 of the spherical motor 1. As seen in the side view of the rotor 4 in FIG. 4, the axial proportion of the force proportions of the radial forces FR acting perpendicularly to the rotor surface adds up due to the asymmetry of the rotor 4 of the spherical motor 1, and these then form an axial force FA.

In FIG. 5 there is displayed an engine control 8 activating the spherical motor 1 as a synchronous motor, wherein the engine control 8 is formed as a field oriented torque control. The engine control 8 has a voltage converter 9 in which there are provided a rectifier 10 and a three-phase inverter 11. The system voltage of, for example, 230V and 50 Hertz applied at the rectifier 10 is rectified in the rectifier and decoupled by means of a decoupling capacitor. The direct current voltage which has been decoupled is fed to the three-phase inverter 11 which is further fed operating information RI predetermining per stator coil 7 the coil voltage US rotating with the co-ordinate system. The three-phase inverter 11 impresses the coil voltage IS according to the operating information RI upon each of the three stator coils 7, resulting in the formation of the coil current IS in the respective stator coils 7.

The engine control stage 12 comprises a feedback stage 13 which is supplied with revolution and/or positioning information PI from the spherical motor. The feedback stage 13 is formed for evaluating the revolution and/or positioning information PI and for emitting angle information WI. The angle information WI contains information on the active angular position of the rotor 4 and the rotor angle θ, respectively, and hence also information on the active torque of the spherical motor 1.

The engine control stage 12 has a transformation stage 14 which may be fed current information SI from the current sensor located at the feed lines of the coil current IS. The transformation stage 14 is provided for evaluating the current information SI and the angle information WI. In addition, the transformation stage 14 is provided for transforming the information evaluated according to the Clark and Park Transformation and for emitting an operating direct current RDI and an operating control cross current RQI in the standing co-ordinate system.

The engine control stage 12 has addition and subtraction stages 15 and 16, respectively, wherein there is in the first stage 15 subtracted the operating cross current RQI (set value minus actual value) from the cross current component IQ predetermined according to the desired number of revolutions performed by the spherical motor 1. In the second stage 16 the operating current component RDI is subtracted from the predetermined direct current component ID. The current components of the coil current IS added by the addition and subtraction stages 15 and 16, respectively, are fed to the PID controls 17 and 18, provided for emitting control information for the cross current component RQ and an operating information for the direct current component RD, although still in the rotating co-ordinate system. By means of a reverse transformation stage 19, the operating information RQ and RD for the cross current component and the direct current component are transformed back into the stationary three-phase co-ordinate system according to the Reverse Clark and Park Transformation. The reverse transformation stage 19 is provided for emitting operating information RI to the three-phase inverter 11.

The engine control described above was only explained in a rather rough outline, as the stages of the engine control described are already generally known and have been realised in integrated circuits commonly available. It has been proven in practice that there may be generated mechanical oscillations in a spherical motor 1 activated by such an engine control. Examinations have shown that these oscillations are generated by hydraulic forces and by a non-ideal magnetic configuration of the brushless and permanent magnet excited spherical motor 1 as well as by oscillating permanent and electromagnetic forces oriented perpendicularly to the rotor surface, with forces and especially axial forces acting in an oscillating way on the rotor and the pump rotor disc, respectively. These oscillations may, for example if the spherical motor is used as a heat-circulation pump, be transmitted via the heat lines to the entire heat system and hence result in disturbing noise in the entire house. The same is true for cylinder motors, in which the oscillating forces in the gap between rotor and stator generate oscillations which may result in noise.

The engine control 1 according to the invention now has a direct current generator 20 which may be supplied with angle information WI evaluated by the feedback stage 13 also containing information on the active number of revolutions performed by the spherical motor 1. The direct current generator 20 analyses this angle information W1, the operating cross current RQI as well as other information available in the engine control 8, in order to generate oscillations in the spherical motor 1 with antipoles to the mechanical oscillations. The direct current generator 20 is therefore formed for generating an alternating part and a periodically alternating direct current component IDW, respectively, subtracted in the first stage 15 together with the operating direct current RDI from the set value of the constant direct current component ID.

In the following, there is explained with the help of a specific example how the periodically alternating direct current component IDW is calculated by the direct current generator 20 and what frequencies have to be taken into consideration for IDW, respectively. In an ideal way, the rotor magnetic field RM is configured alongside the air gap between rotor 4 and stator 3 in a sinusoidal way. Conditional upon the manufacturing process (for example, due to the magnetisation of the rotor or due to the motor configuration itself), there are formed, in addition to the fundamental wave, also higher harmonics in the rotor magnetic field RM. In the specific example there is provided the fifth harmonic, this is, the absolute value of the flux density of the rotor magnetic field RM may be determined by $$B_{RM}(\theta)=B_1 \sin(\theta)+B_5 \sin(5\theta+\theta_0).$$

Due to the field oriented control, the sinusoidal currents with IQ=I and ID=0 are impressed and they are determined by the impressed coil voltage US so that there is determined with $B_1$ a constant torque, independent of the rotor angle θ. Furthermore, this standardised current feed with $B_1$ does not generate any radial forces FR. The interaction between the sinusoidal currents with the fifth harmonic in the rotor magnetic field RM causes torque variations, on the one side, provoking no further problems in this specific example. On the other side, there are generated through $$FR_1 \sim B_5 \sin(5\theta+\theta_0) IQ \cos(\theta)$$

$$FR_1 \sim B_5 IQ \sin(6\theta+\theta_0) + B_5 IQ \sin(4\theta+\theta_0)$$

forces FR which are oriented perpendicularly to the rotor surface at every single winding of the stator coils 7. In examination of the other two windings, there is determined $$FR_2 = FR_1(\theta - 120°)$$

$$FR_3 = FR_1(\theta - 240°)$$

Especially the force FR with 6-fold frequency, which is generated and acts perpendicularly to the rotor surface, is of special interest as the partial forces of the individual windings add up. In the given spherical motor 1 there are developed resulting axial forces which cause vibrations with the 6-times electrical and 12-times mechanic frequency, respectively.

In order to damp or eliminate these oscillations, there is determined via the method described the periodically alternating direct current component IDW with $$IDW = c \sin(6\theta + \theta_1)$$

wherein there may be exactly adapted the phase position via $\theta_1$ as well as the amplitude via c. As the radial forces FR are in the present case directly dependent on the cross current component IQ, it definitely makes sense to determine the amplitude c directly proportional to the cross current component IQ.

Also the temperature may influence the axial forces and vibrations of the spherical motor 1. If the temperature changes, also the magnetic field force of the rotor magnetic field RM decreases. The direct current generator 20 may also include this effect when generating the periodically alternating direct current component IDW, whereby there may be provided a temperature sensor for evaluating the temperature, or there may be made use of a mathematical model for assessing the temperature. The temperature here forms an example for some further information available in the engine control 8, which is evaluated in order to generate an optimally adapted and periodically alternating direct current component IDW.

By providing the direct current generator 20 and by impressing the coil voltage US in order to establish a periodically alternating direct current component IDW, there is achieved the advantage that periodically alternating and especially axial oscillations act on the rotor 4 and, in an ideal case, totally compensate for the mechanical oscillations. In this way, the spherical motor 1 may be operated essentially quieter, providing for essential advantages if the spherical motor 1 is used as a circulation pump in the heating system of a house.

In the direct current generator 20 there are provided further adaptation means 21, which may be supplied with adaptation information AI evaluated by means of measuring the oscillations performed by the spherical motor 1, on the basis of which the direct current generator 20 is formed for generating a direct current component IDW, especially well-adapted to the spherical motor 1 to be activated. The axial oscillations may be measured, for example, by means of one or several Hall sensors attached at one or several positions at the spherical motor 1. The measuring data evaluated are stored as parameters in storage means of the adaptation means 21, and they are taken into account for evaluating the alternating direct current component IDW, adapted to the spherical motor 1. In addition, the type of the synchronous motor, this is, for example, a spherical motor or an electric motor with cylindrical rotor, is stored in the adaptations means 21, in order to achieve accordingly good adaptation of the synchronous motor to be activated. In this way, there is provided the advantage that the mechanical oscillations of the spherical motor 1 may be virtually totally compensated for, and hence the spherical motor 1 will run especially quietly.

Analogously, the same is true for cylinder motors in which it is not the axial oscillation resulting in noise but rather a radial oscillation in the gap between rotor and stator.

FIG. 6 shows a block diagram of an engine control 22 with a direct voltage generator 23. At this, the configuration of the engine control 33 according to FIG. 5 corresponds with the configuration of the engine control 8 according to FIG. 6, with the direct voltage generator 23 instead of the direct current generator 20 generating a periodically alternating direct voltage component UDW, which will be added via a third addition stage 24 following the PID controller 17. Also in the engine control 22, the coil voltage US is impressed upon the stator coils 8, with the coil voltage containing accordingly the direct voltage component UDW generated by the direct voltage generator 23.

Also in the engine control 22 the provision of adaptation means 25 in the direct voltage generator 23 is advantageous. Through the engine control 22, there are achieved the same advantages as described above by way of the engine control 8.

It is to be noted that the feedback stage in the engine controls 8 and 22 may also be omitted, and that the angle information WI may also be mathematically evaluated via electric variables (currents and voltages).

It is to be noted that an engine control according to the invention may be adapted to synchronous motors with a different number of N of stator coils, poles in the rotor and phases for activation in the synchronous motor.

It is to be noted that the superimposition of the predetermined direct current component ID and the operating direct current RDI for subtraction may also be realised analogously.

The invention claimed is:
1. An engine control for a synchronous motor comprising:
a number of N stator coils set off in regard to each other and arranged around a rotor of the synchronous motor, wherein a coil voltage may be impressed upon the stator coils by the engine control and wherein a coil current is generated having a direct current component in a co-ordinate system rotating proportionally with a number of revolutions performed by the synchronous motor as well as a cross current component, wherein the cross current component effects a tangential force activating the rotor in the direction of rotation and wherein the direct current component effects a force perpendicularly to a hemispherical rotor surface of the rotor, wherein
the engine control includes a direct current generator for generating a direct current component periodically alternating in the rotating co-ordinate system, in order to neutralize oscillations of the synchronous motor activated by the engine control by means of a force which is generated perpendicularly to the hemispherical rotor surface, wherein the direct current generator generates the direct current component by evaluating at least one angle information and an operating cross current and wherein the engine control is optimized for controlling the synchronous motor with the hemispherical rotor surface of the rotor.

2. The engine control according to claim 1, wherein the direct current generator includes adaptation means which may be supplied with adaptation information evaluated by means of a measurement of the oscillations performed by the synchronous motor, wherein the engine control is configured to generate an alternating direct current component adapted to the synchronous motor to be activated based on the adaptation information.

3. The engine control according to claim 1, further comprising a direct voltage generator for generating a direct voltage component periodically alternating in the rotating co-ordinate system, wherein the direct voltage generator is used to neutralize oscillations of the synchronous motor activated by the engine control by means of forces generated and oriented perpendicularly to the hemispherical rotor surface instead of the direct current generator.

4. The engine control according to claim 1, wherein the engine control is formed by a field-oriented control.

5. A system comprising a synchronous motor and the engine control according according to claim 1 for controlling a spherical motor.

6. A method for controlling a synchronous motor, the method comprising:
impressing a coil voltage upon a number of N stator coils set off in regard to each other, which are arranged around a rotor of the synchronous motor and in which there is formed a coil current, wherein the coil current has a direct current component in a co-ordinate system rotating proportionally with the number of revolutions performed by the synchronous motor as well as a cross current component and wherein the cross current component effects a tangential force activating the rotor in the direction of rotation and wherein the direct current component effects a force perpendicular to a hemispherical rotor surface of the rotor, and
generating a direct current component periodically alternating in the rotating co-ordinate system and predetermined by impressing the coil voltage in order to neutralize oscillations of the synchronous motor activated by the engine control by means of a force acting perpendicularly to the hemispherical rotor surface, wherein at least one angle information and an operating cross current are evaluated for generating the suitable and periodically alternating direct current component.

7. The method according to claim 6, further comprising measuring the oscillations of the synchronous motor and using adaptation information evaluated thereby for generating the alternating direct current component.

8. The method according to claim 6, further comprising impressing a direct voltage component periodically alternating in the rotating co-ordinate system instead of the alternating direct current component, in order to neutralize oscillations of the synchronous motor activated by the engine control by means of forces acting perpendicularly on the hemispherical rotor surface.

* * * * *